United States Patent [19]

Urban

[11] Patent Number: 4,471,859

[45] Date of Patent: Sep. 18, 1984

[54] DRUM BRAKE

[75] Inventor: John A. Urban, Plainwell, Mich.

[73] Assignee: Eaton Corporation, Cleveland, Ohio

[21] Appl. No.: 385,731

[22] Filed: Jun. 7, 1982

[51] Int. Cl.³ .............................................. F16D 51/22
[52] U.S. Cl. ...................................... 188/216; 24/629;
74/569; 188/250 C; 188/325; 188/329; 192/75
[58] Field of Search ................... 188/216, 250 C, 326,
188/327, 328, 329, 330, 331, 332, 333, 334, 335;
59/86; 192/75, 76, 101; 24/351, 352, 135R, 136B,
201 LP, 243 B, 74/569; 267/74, 179; 70/459

[56] References Cited

U.S. PATENT DOCUMENTS

| 195,940 | 10/1877 | Martin | 70/459 X |
|---|---|---|---|
| 2,022,254 | 11/1935 | Pentz | 188/328 X |
| 2,781,868 | 2/1957 | House | 188/330 |
| 2,928,506 | 3/1960 | Goldman | 188/78 |
| 3,275,103 | 9/1966 | Lyon | 188/332 |
| 3,292,401 | 12/1966 | Van Meter | 70/459 |
| 3,368,648 | 2/1968 | Brownyer | 188/250 C X |
| 3,469,660 | 9/1969 | Mathers | 188/330 |
| 3,497,040 | 2/1970 | Powers | 188/216 |
| 4,076,433 | 2/1978 | Halopoff | 267/74 X |
| 4,183,571 | 1/1980 | Renfroe | 24/243 B X |

FOREIGN PATENT DOCUMENTS

| 484617 | 7/1952 | Canada | 59/86 |
|---|---|---|---|
| 52-40273 | 9/1975 | Japan | 188/250 C |

Primary Examiner—George E. A. Halvosa
Attorney, Agent, or Firm—H. D. Gordon; C. H. Grace

[57] ABSTRACT

An improved expanding shoe drum brake (10) is provided. The brake includes a shaft-like mounting structure (42) for retaining the hook ends (40) of a heavy duty brake return spring (28). The retaining assembly includes a fixed portion (44) and an axially movable portion (46). The axially movable portion is normally abutting with the fixed portion but may be selectively axially moved away therefrom for assembly and disassembly of return spring (28) from the brake assembly (10).

4 Claims, 3 Drawing Figures

DRUM BRAKE

BACKGROUND OF THE INVENTION

1. Field of the Invention

The present invention relates to an expanding shoe drum brake and in particular to an improved expanding shoe drum brake of relatively heavy duty construction having improved means for return spring attachment and/or improved means for retaining the cam follower rollers.

2. Description of the Prior Art

Expanding shoe drum brakes, especially air or hydraulically actuated drum brake systems wherein arcuate brake shoes are secured to a portion of a wheeled vehicle and are pivotally rotated about an anchor member or members into engagement with a rotating annular brake drum for the purpose of retarding the velocity of the wheeled vehicle by the use of a brake actuating member, such as a displaceable cam element, are well known in the art. The brake actuating cam member, usually a rotatable cam element or a linearly movable wedge element, is located between the adjacent ends of the pivotal brake shoes and is secured to a rotatable cam shaft or to a linear actuation shaft, respectively, for translating oscillatory, generally linear motion from a power source, such as an air motor or the like, to the brake shoe.

The actuating member, often in the form of a so called "S" cam or a wedge, is usually located between cam or wedge followers, often in the form of rollers, rotatably fixed to the ends of the brake shoes.

Examples of such prior art cam actuated drum brakes may be seen by reference to U.S. Pat. Nos. 3,497,037; and 3,096,857 both of which are hereby incorporated by reference.

While the prior art cam and/or wedge actuated drum brakes, especially the "S"cam type drum brakes, are well received and accepted such prior art devices are not totally satisfactory in certain situations, especially when relatively heavy duty components such as return springs are utilized, as assembly of such heavy duty return springs to the brake shoes was often a difficult and time consumming task. Additionally, in certain heavy duty applications, it is important that the webs of the brake shoes be prevented from spreading and that the cam follower rollers be securely retained to the brake shoes but easily selectively removable therefrom. While the structures of the prior art devices were generally satisfactory for use in light weight and/or standard duty application drum brakes, when heavy duty components were utilized, such structures often did not provide the strength or did not provide the ease of assembly and disassembly which is considered desirable. Examples of such prior art structures may be seen by references to U.S. Pat. Nos. 2,928,506 and 3,275,103, both of which are hereby incorporated by reference.

SUMMARY OF THE INVENTION

In accordance with the present invention, the drawbacks of the prior art have been overcome to the extent than an improved drum brake, preferably a cam actuated drum brake, is provided having relatively heavy duty structures, such as heavy duty return springs and the like, wherein disassembly and reassembly of the brake structure for replacing worn friction material and the like is relatively simply and quickly accomplished. Preferably, a cam follower roller retaining structure is provided which will retain the cam follower rollers assembled to the brake shoes while allowing selective removal thereof and which will also prevent undesirable spreading of the brake shoe webs.

The above is accomplished by providing a brake shoe assembly having relatively heavy duty return springs wherein the return springs are attached to each brake shoe by means of a rod or bridge assembly extending between the webs of the brake shoe over which the hook ends of the brake return shoes are received. The rod or bridge structure includes a first portion which may be fixed to the brake shoe and a second portion which is selectively axially movable relative to the first portion for assembly and disassembly of the return springs from the shoes. Preferably, a pair of resilient clips are provided for retaining the cam follower rollers to the brake shoe and the clips are retained to the brake shoe by a through bolt which extends through both of the brake shoe webs to prevent spreading of the webs.

Accordingly, it is an object of the present invention to provide a new and improved expanding shoe drum brake of the type utilizing relatively heavy duty return springs wherein the return springs may be quickly and easily removed from the brake shoes.

Another object of the present invention is to provide a new and improved expanding shoe drum brake of the type wherein the cam follower rollers are positively retained to the brake shoes by means allowing selective removal thereof which means will prevent spreading of the brake shoe webs.

This and other objects and advantages of the present invention will become apparent from a reading of the detailed description of the preferred embodiment taken in connection with the attached drawings.

DESCRIPTION OF THE PREFERRED EMBODIMENT

Figure 1:
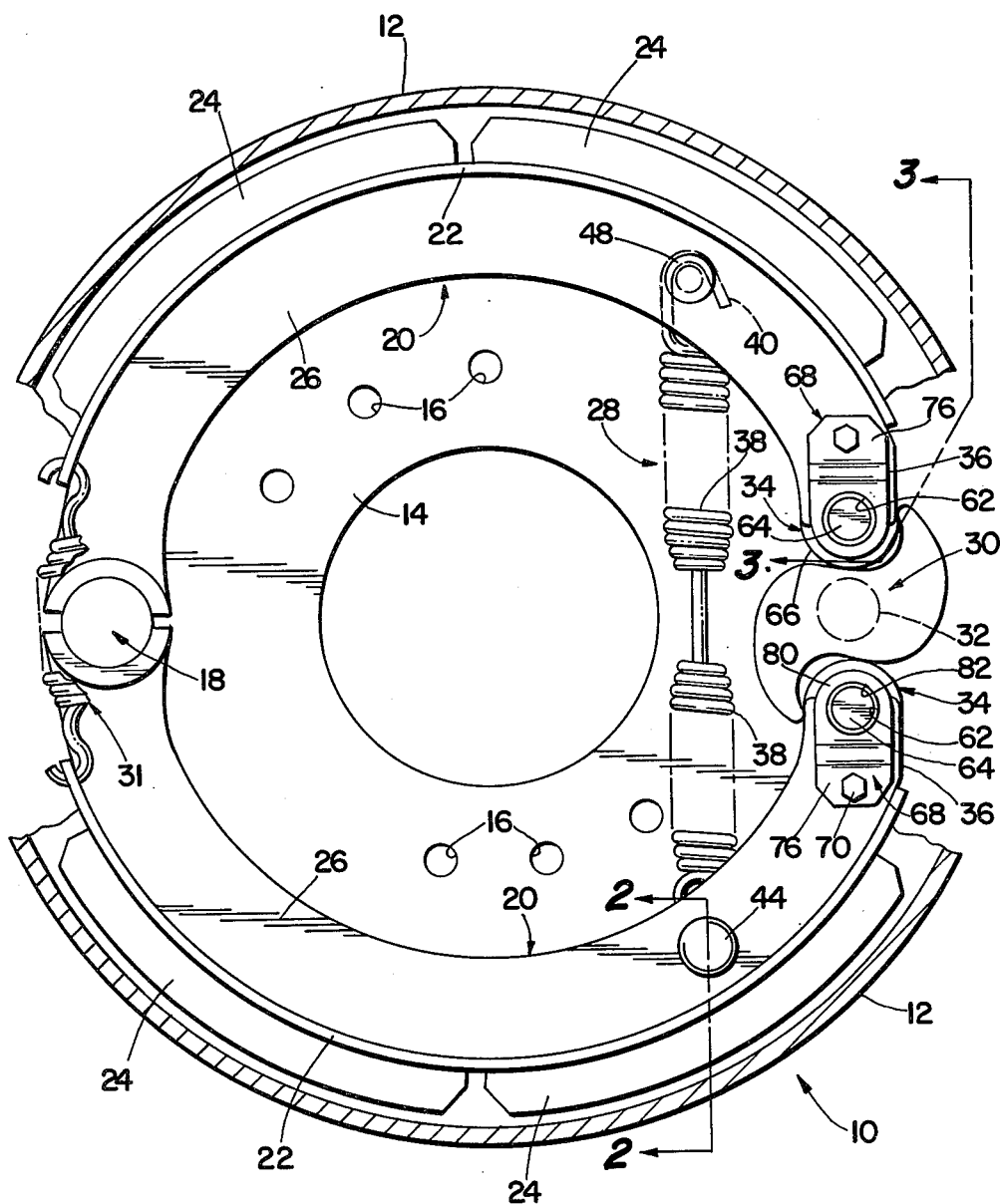
FIG. 1 is a front view of the expanding shoe drum brake of the present invention.

Certain terminology will be used in the following description for convenience in reference only and will not be limiting. The words "upwardly," "downwardly," "rightwardly," "leftwardly" will designate directions in the drawings to which reference is made. The terms "inwardly" and "outwardly" will refer to directions toward and away from, respectively, the geometric center of the device and designated parts thereof. Said terminology will include the words above specifically mentioned, derivatives thereof and words of similar import.

The term "brake" as used herein is intended to include various frictional coupling devices such as clutches, brakes and the like.

The term "heavy duty brake" is used to describe brakes which utilize relatively heavy duty components, such as relatively heavy duty return springs, washers and other members, and which are usually intended for relatively difficult duty usually in areas where servicing of the brakes cannot be accomplished on a regular maintenance schedule and reliability is considered to be at an extreme premium often to the detriment of economical design and/or weight considerations. Heavy duty brakes are often utilized in areas such as developing countries and/or in applications wherein vehicles may be extremely heavily loaded. While the present invention is especially well suited for heavy duty brakes, it is also applicable to light and standard duty brake structures.

Figure 2:
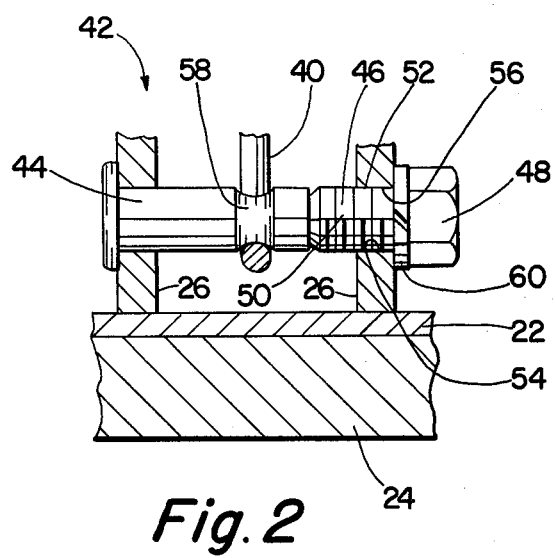
FIG. 2 is a sectional view taken substantially along the line 2—2 in FIG. 1.
Figure 3:
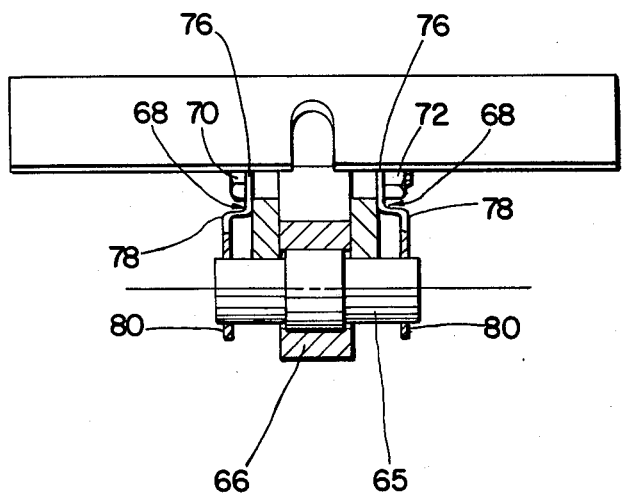
FIG. 3 is a partial view taken substantially along the line 3—3 in FIG. 1.

In FIGS. 1-3, there is shown the expanding shoe drum brake assembly 10 of the present invention. For illustrative purposes only, the drum brake assembly 10 illustrated is of the "S" cam type utilizing a single anchor pin. It is understood, however, that the present invention is equally applicable to those expanding shoe drum brake assemblies utilizing other brake actuating means, such as wedge actuators and the like, and is also equally applicable to those drum brake assemblies utilizing other types of anchor structures, such as twin anchor pins and the like. Drum brake assembly 10 comprises a generally annular rotatable drum 12 (a portion of which is shown in section), a brake support member or spider 14 nonrotatably secured to a portion of the vehicle by a plurality of suitable fasteners such as bolts (not shown) received through bolt circle holes 16, a brake shoe pivot or anchor pin 18 secured to the spider 14, a pair of opposed, generally arcuate brake shoes 20 including a braking lining support or table 22 and a brake lining 24 of suitable friction material and substantially parallel radially inwardly extending dual webs 26, relatively heavy duty brake return spring 28 and a cam element 30 for causing generally radially outward pivotable movement of the brake shoes 20 and brake linings 24 about the pivot or anchor pin 18 and into engagement with the brake drum 12 for braking movement of the vehicle in a known manner. Retaining spring 31 will retain the brake shoes 20 pivotably supported on the anchor pin 18.

Cam 30 is nonrotationally fixed to or integral with a cam shaft 32. Cam shaft 32 is usually received within a cam shaft tube (not shown) which is fixed to the spider. Usually, the other end of the cam shaft 32 is provided with splines or the like for nonrotational receipt of a lever member (not shown) such as the lever body of an automatic or manual slack adjuster as is well known in the art. As is well known, an actuator such as an air motor (not shown) will cause pivotable movement of the lever body about the rotational axis of the cam to cause a corresponding pivotal movement of cam 30.

The general structure and operation of cam actuated expanding shoe drum brakes such as has been briefly described above is well known in the art and may be appreciated in further detail by reference to U.S. Pat. Nos. 3,497,037; 3,096,857 and 3,507,369, as of which are hereby incorporated by reference. Briefly, the brake assembly 10 illustrated in FIG. 1 is shown in the at rest or retracted position whereat the brakes are not applied. When it is desired to retard motion of the brake drum 12, which is usually fixedly attached to the wheels of a vehicle, the brakes are actuated by rotation of the actuating member or cam 30 in a clockwise direction of rotation, which will cause radially outwardly pivotal movement of the brake shoes 20 about the anchor pin 18 to bring the friction linings into frictional contact with the brake drum 12. Upon a counterclockwise rotation of cam 30 to the position shown in FIG. 1, the shoes 20 will radially retract under the influence of return spring 28.

Cam followers 34 are preferably in the form of rollers which are rotationally mounted to the ends 36 of the brake shoe webs 36 and cause to bear against the periphery of the working surfaces of cam 30 by compression return springs 28 as is well known in the art. Clockwise rotation of the cam 30 from the position illustrated in FIG. 1 will result in the cam followers 34 and the brake shoes being forced radially outwardly resulting in the generally arcuate brake shoes 20 pivoting radially outwardly about pivot point and brake anchor pin 18 sufficiently to cause brake friction material 24 to frictionally engage brake drum 12. A subsequent counterclockwise rotation of cam 30 will cause the brake shoes to pivot radially inwardly to the brake release position shown in FIG. 1.

The above described structure of brake assembly 10 is relatively standard brake assembly and is well known in the prior art. If brake assembly 10 is to be utilized for heavy duty applications, it is desirable that the the compression return spring 28 have a significantly higher spring rate than is normally utilized and that the rollers 34 be positively retained to the brake shoes 20 to minimize the chances of loss thereof during operation or during servicing of the brakes in the field in a remote location or the like. In heavy duty applications it is also desirable that the webs 26 be prevented from undesirable spreading, especially at the end 36 of the brake shoes 20 closest the cam 30. The structure of the improved brake assembly 10 of the present invention provides these desirable features as will be described in greater detail below.

Brake return spring 28, is a tension return spring having a central coil portion 38 and hooked ends 40 at each end thereof. The coil portion 38 may be a single coil portion or multiple coil portions as is shown. Hook ends 40 of the spring are retained on a shaft-like, or bridge, spring retaining assembly 42 extending between the dual webs 26 of the brake shoe 20 (see FIG. 2). The return spring 28, is a heavy duty brake, is of a significantly higher than normal spring rate to prevent the hooked ends 40 from being disengaged from the retaining assemblies 42 during vehicle vibration or the like. The spring retaining assembly 42 illustrated comprises a fixed shaft portion 44 which is fixedly attached to the lefthand one of the webs 26 and extends partially, preferably more than halfway, towards the other, or righthand, web. The fixed shaft portion 44 is spaced from the other web 26 by a distance at least as great as the diameter of the wire from which the hook end 40 of spring 28 is formed. An axially movable portion 46 of assembly 42 normally abuts fixed portion 44 as is seen in FIG. 2. Preferably, axially movable portion 46 comprises a bolt having a head 48 and a threaded shaft 50 having external threads 52 which threadably engage internal threads 54 formed in an aperture 56 provided in web 26. The shank of fixed portion 44 may be provided with a relatively shallow groove 58 for generally centering the hooked portion 40 of compression spring 28 an equal distance between the two webs 26 of brake shoe 20. Groove 58 may be offset if required.

Brake shoe webs 26 are provided with aligned arcuate notches 62 at ends 36 thereof. Roller notches 62 will rotationally support the reduced diameter ends 64 of cam follower roller pin or axle 65 with the enlarged diameter central roller portion 66, which is relationally supported on pin 65, of the roller assembly being received between the webs 26. A spring clip 68 is mounted to the outer surface of each web 26 by a through bolt 70 and nut 72. A self locking nut, a jam nut or a welded nut may be utilized in connection with bolt 70 and nut 72. Each spring clip 68 is preferably formed from a stamping and includes a base portion 76 extending generally parallel to the web, a raised portion 78 extending outwardly from the web and a retaining portion 80 spaced from and extending generally parallel to the webs 26. Spaced portion 80 has an aperture 82 therethrough for receipt of the reduced diameter end portions 64 of the cam follower rollers. In the position shown in FIGS. 1 and 3, the rollers 34 are retained in their positions in notch 62 of webs 26 by means of the aperture 82 of spring clips 68. For purposes of assembling the cam follower rollers 34 to, or disassembly of the cam follower rollers from, the brake shoes 20, one of the spring clips 68, preferably the outboard clip, may be resiliently deflected outwardly to disengage the reduced diameter portion 64 of the cam follower roller 34 and pivoted about 45[ to 90[. It may be seen that the clips 68 will positively retain the rollers 34 to the brake shoes 20 but will allow the selective release and assembly of the rollers to the brake shoes 20. Additionally, bolt 70 and nut 72 will provide rigid resistance to outward deflections of webs 26 at the ends 36 of the brake shoes 20.

In the position shown in FIG. 2, spring retaining assembly 42 will positively retain spring 28 to the brake shoes 20 as the relatively heavy tension force on spring 28 will prevent an axial expansion thereof sufficiently to cause the hooked end 40 thereof to clear the assembly 42. When it is desired to remove the spring 28 from the brake shoes 20 for purposes of servicing the brake, such as for replacing friction material and the like, the following procedure is utilized, (1) axially movable portion 46 of spring retaining assembly 42 is moved axially away, rightwardly, from fixed portion 44 to create a distance or gap between the opposed shaft ends of portions 44 and 46 greater than the diameter of hook portion 40; (2) one of the spring clips 68 on each shoe is lifted outwardly to disengage the reduced diameter portion of cam follower roller pin 65 and pivoted to release the roller pin; (3) the upper shoe is pried upwardly (a screw driver or other lever between the table end and the pin assembly 44 is useful for this operation) and the roller removed; (4) the lower shoe is pried downwardly and the roller removed; (5) the lower shoe is raised upwardly toward the cam to cause the spring retaining assemblies 42 to move more closely together for easy clearing of the hook end 40 from groove 58; and (6) hooked end 40 is then slid rightwardly (as seen in FIG. 2) over the fixed end of portion 44 and removed through the gap between opposed shaft ends 44 & 46. This procedure allows for quick and easy assembly and disassembly of relatively heavy duty return spring 28 and requires no or only a minimal axial expansion of return spring 28. As may be seen by reference to FIG. 1, to allow the return spring 28 to be removed from either inboard or outboard sides of brake pin, both the inboard and outboard sides of brake 10 will present one bolt head 48 and one fixed portion 44. Preferably, a lock washer such as washer 60 will be provided to firmly lock bolt 46 in position. Of course, two axially movable shaft portions, similar to bolt 46, could be utilized in place of the fixed portion 44 and the movable portion 46.

It may be seen from the above, that an expanding shoe drum brake is provided which utilizes a brake return spring mounting structure which allows relatively quick and simple assembly of the brake shoe return spring to the brake assembly and which may preferably include means to removably retain the cam follower rollers to the brake shoes which means will also prevent undesirable spreading of the brake shoe webs.

Although this invention has been described in its preferred embodiment with a certain degree of particularity, it is understood such description is by way of example only and that certain modifications are possible within the spirit and the scope of the invention as hereinafter claimed.

I claim:

1. An improved expanding shoe brake drum comprising:
    a spider member;
    a selectively displaceable brake actuation means mounted to said spider member;
    a pivot structure fixed to said spider member;
    a pair of generally arcuate radially outwardly movable brake shoes pivotably supported on said pivot structure, each of said brake shoes carrying a roller follower engaged by said actuation means for movement therewith, said actuation means having a first position for causing said shoes to be radially retracted and a second position for causing said shoes to be radially expanded;
    each of said brake shoes comprising a generally arcuate table structure carrying frictional material on the radially outer surface thereof and an inboard and an outboard web extending generally radially inwardly from said table structure; and
    a tension coil return spring attached at its opposite ends to each of said brake shoes for maintaining said followers engaged with said actuation means, said coil return spring being provided with a hook end at each end thereof for attachment of said spring to said brake shoes;
    the improvement comprising:
    means for attaching said return spring to said brake shoes comprising a shaft-like mounting assembly extending from said inboard web to said outboard web of each brake shoe about which the hook ends of said return spring are retained, at least one of said mounting assemblies comprising a first member extending from said outboard web member toward said inboard web member and a second member generally coaxial with said first member and extending from said inboard web member toward said outboard web member, the free end of said second member abuttable with the free end of said first member said second member fixed to said inboard web member and said first member comprising an externally threaded shaft threadably engaged with internal threads provided in an aperture through said outboard web member and axially movable towards and away from said second member, said second member having an axial extension of greater than half the distance between said web members and provided with a recess on the outer surface thereof located substantially equal distance between said inboard and outboard web members.

2. The improved brake of claim 1 wherein said first member comprises a portion accessible from the outboard side of said outboard web for imparting a rotational motion to said first member relative to said outboard web.

3. The improved brake of claim 1, wherein said movable member is provided with means for lockingly retaining said axially movable member in position abutting said fixed member.

4. The improved brake of claims 1 or 3, further including resilient clips means attachable to both said inboard and outboard webs for removably retaining said followers to said web members, said means for mounting said clips to said webs comprising a through bolt and a nut which will tend to resist spreading of said web members.

* * * * *